United States Patent [19]

Gray

[11] Patent Number: 4,649,727
[45] Date of Patent: Mar. 17, 1987

[54] ROTARY DRIVER AND SWAGING TOOL

[75] Inventor: Warren E. Gray, Woodland Hills, Calif.

[73] Assignee: Northrop Corporation, Hawthorne, Calif.

[21] Appl. No.: 671,527

[22] Filed: Nov. 15, 1984

[51] Int. Cl.[4] .................. F16B 39/22; F16B 39/02; B21D 39/00

[52] U.S. Cl. .......................... 72/75; 72/126; 29/517; 29/526 R; 81/10; 81/121.1; 81/471; 411/336; 411/361

[58] Field of Search ............... 72/75, 69, 112, 126, 72/367; 29/517, 526 R; 411/361, 333–336, 937, 937.1, 937.2, 972, 280–287; 81/10, 121.1, 53.2, 59.1, 471; 10/86 A; 279/76, 77

[56] References Cited

U.S. PATENT DOCUMENTS

| | | | |
|---|---|---|---|
| 692,988 | 2/1902 | Davis | 81/53.2 |
| 751,345 | 2/1904 | Saunders | 81/53.2 |
| 1,373,617 | 4/1921 | Johnson | 81/53.2 |
| 1,594,515 | 8/1926 | Bruhn | 81/53.2 |
| 2,449,247 | 9/1948 | Paucek | 72/125 |
| 2,613,942 | 10/1952 | Saunders | 81/53.2 |
| 2,966,082 | 12/1960 | Skidmore | 81/10 |
| 3,003,378 | 10/1961 | Hotchner | 411/937.2 |
| 3,216,302 | 11/1965 | Kluth | 411/937.1 |
| 3,421,562 | 1/1969 | Orloff et al. | 411/336 |
| 3,517,533 | 6/1970 | Koznar | 72/126 |
| 3,621,502 | 11/1971 | Velthoven | 411/937.1 |
| 3,798,749 | 3/1974 | Duer | 81/10 |
| 3,815,397 | 6/1974 | Hollencamp | 72/126 |
| 3,889,557 | 6/1975 | Young | 81/53.2 |
| 3,924,434 | 12/1975 | Fulier | 72/75 |
| 4,033,163 | 7/1977 | Duffey et al. | 72/126 |
| 4,102,168 | 7/1978 | Brookes et al. | 72/117 |
| 4,260,005 | 4/1981 | Stencel | 411/281 |
| 4,408,936 | 10/1983 | Williamson | 411/281 |
| 4,539,872 | 9/1985 | Bochman | 81/53.2 |
| 4,544,312 | 10/1985 | Stencel | 411/281 |
| 4,569,259 | 2/1986 | Rubin et al. | 81/121.1 |
| 4,601,623 | 7/1986 | Wallace | 411/336 |

FOREIGN PATENT DOCUMENTS

| | | | |
|---|---|---|---|
| 507567 | 7/1957 | Italy | 72/75 |
| 304126 | 5/1971 | U.S.S.R. | 81/121.1 |

Primary Examiner—Lowell A. Larson
Attorney, Agent, or Firm—Terry J. Anderson; Robert B. Block

[57] ABSTRACT

Disclosed is a rotatably drivable tool for mechanically joining together threaded nut and bolt components of a fastener assembly to maintain together the assembly and workpieces joined thereby, the tool having a socket portion for receiving the nut of the fastener assembly, and swaging inserts spaced inwardly of the interior wall of the tool socket portion to compress a portion of the nut of the fastener assembly into mechanical engagement with the bolt of the fastener assembly upon driving of the tool.

6 Claims, 8 Drawing Figures

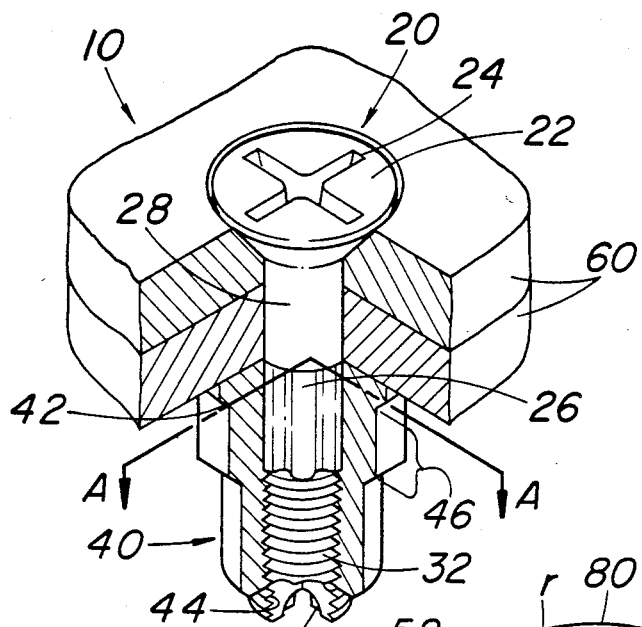
FIG. 1
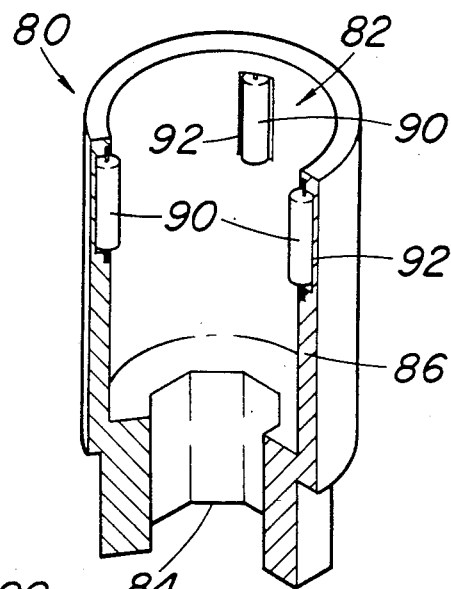
FIG. 2
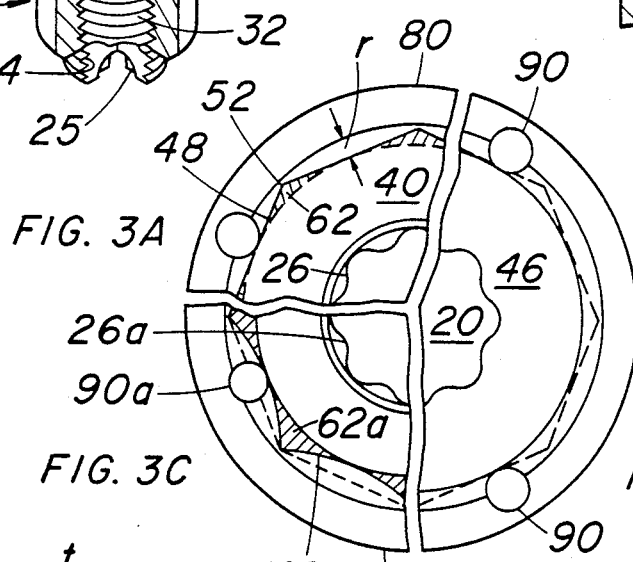
FIG. 3A
FIG. 3C
FIG. 3B
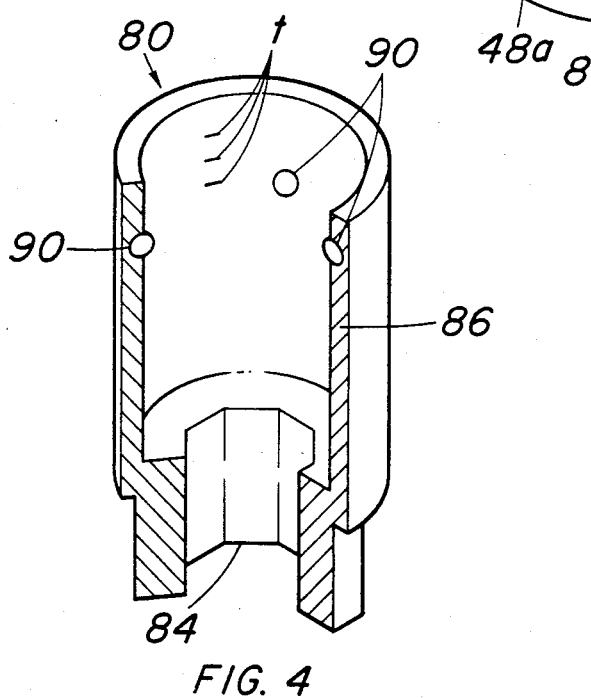
FIG. 4
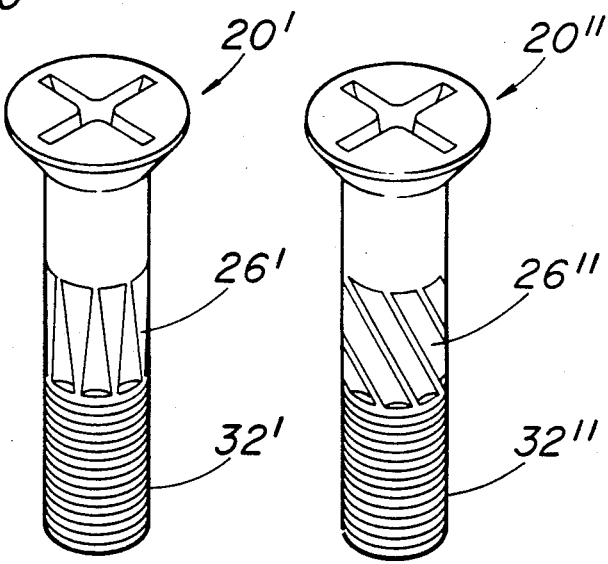
FIG. 5
FIG. 6

ROTARY DRIVER AND SWAGING TOOL

FIELD OF THE INVENTION

The present invention relates to a tool for mechanically joining together fastener assemblies, and in particular, to a swaging tool for mechanically compressing a portion of a nut of a fastener assembly onto a bolt thereof to prevent inadvertent separation of the threaded fastener assembly when used to hold together workpieces in a hostile environment.

Threaded fastener assemblies consist of a nut having internal threads for threading onto external threads of a bolt. External surfaces of the nut accept tools such as wrenches to permit tightly joining together the fastener components and clamping therebetween one or more workpieces, such as structural components or sheets.

In some environments in which workpieces are held together by fasteners, the fasteners must have extremely high integrity and strength. Further, the fasteners must bear loads not only along their longitudinal axes, but radially of such axes, also. During hostile environment operations, loads are generated varying in direction, frequency, and force, as well as expansion and/or contraction due to temperature excursions. Fasteners passing through the sheets become loaded in shear during their resistance to the type of loading when one sheet tends to slide over another. Axial loads on the fastener arise due to the clamping of fastened sheets between a head of the bolt on one side of the sheets, and the nut on the other side of the sheets. Variations in the loads can weaken the fastener and cause potential separation.

A desirable feature of a fastener assembly is that the nut and bolt not come apart or separate during use. Many systems have been suggested in attempts to prevent such separation, but usually have been determined to be inadequate in extremely hostile environments. Typically, when fasteners are used to retain together structures, such as components of aircraft, which are affected by variable and continuing vibrations and changeable forces as caused by jet engines, fastener separation can occur after considerable operation. Upon separation, a nut or bolt when used for example to attach components in the intake path of a jet engine, may be ingested into the engine causing loss of that engine, and possibly loss of the aircraft as well. For such reasons, fasteners must be thoroughly checked periodically to retighten and/or replace any fasteners showing separation and/or weakness. A fastener assembly of the present invention will not eliminate periodic inspections, but will increase the interval between inspections as to fastener effectiveness.

| PRIOR ART STATEMENT | | |
|---|---|---|
| U.S. Pat. No. | Name | Filing Date |
| 2,396,661 | P. B. Keller et al | Jan. 15, 1944 |
| 2,542,376 | H. B. Torresen | Aug. 9, 1944 |
| 3,290,982 | C. F. Marschner | Mar. 20, 1964 |
| 3,418,012 | J. La Torre | Oct. 17, 1966 |
| 3,645,125 | F. A. Summerlin | Feb. 29, 1972 |
| 3,699,637 | F. C. Roslek | Oct. 24, 1972 |
| 4,097,168 | P. V. Pagel | Jun. 27, 1978 |
| 4,233,879 | J. A. Sigmund | Nov. 18, 1980 |
| 4,260,005 | E. L. Stencel | Apr. 7, 1981 |
| 4,370,098 | F. S. Briles | Jan. 25, 1983 |

DESCRIPTION OF THE PRIOR ART

One proposed manner of locking a nut and bolt is to deform the threads of the nut so that they bear inwardly in radial compression against the threads of the bolt. Typical of these devices is described in U.S. Pat. No. 4,260,005 to E. L. Stencel, in which the resistance to unthreading is purely frictional. The pin in this self-locking fastener system is provided with screw threads, the lower of which are broken to permit material of the nut to be deformed into the breaks or removed portions of the threads. Although the nut or collar is deformed during manufacture, vibration during engine operation can cause sufficient minute rotations of the nut relative to the bolt to enable eventual separation as the threads cut through the deformed nut material between the threads.

U.S. Pat. No. 4,370,081 to Briles describes a bolt having a threaded portion remote from the head thereof. A bare portion and a longitudinally grooved portion are arranged intermediate the threaded portion and the head portion. The threaded and grooved portions of th bolt are severed from the fastener portion thereof following assembly, and are thereafter destroyed. Thus, this bolt portion does not function as a part of the fastener assembly when the fastener portions bring workpieces together.

In U.S. Pat. No. 3,699,637 to Roslek is shown a locking fastener system with the bolt attached to the workpieces by staking. The patent employs a bolt or pin that has axial grooves spaced around the outside thereof. The bolt is pressed into a workpiece, and forced therein in frictional engagement prior to staking of a portion of the workpiece about the bolt. The threaded portion of the bolt does not effectively cooperate with a nut or the workpiece during assembly.

Some known fasteners for use in "hostile" environments and in highly stressed assemblies are installed in interference fit with aligned openings in abutting components. A specific example of such fasteners is shown in U.S. Pat. No. 4,097,168 to Pagel. In this patent, the nut engages only the threads of the bolt to pull the tapered shank of the bolt into a predrilled hole causing plastic flow of material into lobes along the shank of the bolt.

In U.S. Pat. No. 3,418,012 to LaTorre, a nut is threaded onto a threaded portion of a bolt to stress the material between the head of the bolt and the nut. The shank of the fluted bolt is in interference fit in the exact size, tapered hole of the workpieces for prestressing the workpieces connected thereby upon threading of the nut on the bolt.

In neither of these patented constructions is the nut swaged to the bolt so as to preclude inadvertent unthreading of the nut from the bolt, and possible separation of the workpieces.

In still other patents, such as U.S. Pat. No. 3,290,982 to Marschner, the nut is swaged onto the bolt by axial movement of a chamfered anvil which causes cold flow or swaging movement of material of the nut into threads of the bolt. Following assembly, the portion of the bolt on which the swaging tool is mounted is broken away.

U.S. Pat. No. 2,396,661 to Keller et al and U.S. Pat. No. 2,542,376 to Torresen disclose a securing device for attaching workpieces together by swaging a malleable collar about a pin to form a composite rivet. The pin is provided with several annular teeth defining grooves therebetween. Material of the collar is forced into the grooves by applying axial pressure from a setting tool. The setting of the fastener assembly, according to these patents, relies on the interior shape of the tool and the significant axial force which must be applied by the tool against the nut.

U.S. Pat. No. 3,645,125 to Summerlin describes a lockbolt swaging apparatus having a nut swaged on a pin in a manner similar to that of Keller et al. The pin is provided with a threaded portion which is removed from the lockbolt after assembly, therefore not providing the substantial attaching means generated by the mechanically mated and threaded portions of the present invention.

U.S. Pat. No. 4,233,897 to Sigmund describes a grooved fastener which includes an unthreaded bolt member having two groups of grooves formed therein, with the depth of each group being the same. A collar is swaged onto the bolt.

The prior art patents approach the problem of a fastening system for use in hostile environmental conditions in many ways. However, none describe a concept having the permanence of assembly as the assembly of the present invention. None describe the combination of a bolt of a fastener assembly having a substantially axially aligned rotation resisting surface formed along the shank of the bolt interiorly of a threaded portion, to which a nut, during assembly, is deformed compressively into spline-like portions for engaging the rotation resisting surfaces of the bolt, and being incapable of unthreading over the threaded portion of the bolt, whereby the assembly is made inseparable by untorqued rotational forces.

SUMMARY OF THE INVENTION

The present invention provides a unique fastener assembly tool for mechanically locking the nut of the assembly to the bolt thereof, sufficiently to preclude inadvertent separation of the fastener assembly.

In the invention, the bolt of the fastener assembly is provided with a substantially axially oriented rotation resisting knurled surface portion forming shank radius elevations or splines internally of and contiguous with a threaded portion of the bolt. The nut of the fastener assembly is provided with a threaded portion, and a non-threaded portion of an internal diameter corresponding to the maximum diameter of the thread of the bolt with which it is to be used. After threading the nut onto the bolt, the nut is swaged or compressed mechanically so that some of the material of the non-threaded portion thereof is deformed into the rotation resisting surface portion of the bolt. Because of the deformation of the nut into the axially aligned grooves of the knurled surface, the nut cannot be vibrated loose from the bolt. Hostile environments are unable to establish sufficient twisting and/or axial torque to cause the deformed portion of the nut to move axially over the threaded portion of the bolt, and/or the threaded portion of the bolt to cut a groove into the axially deformed portion of the nut.

The driver and swaging tool of this invention functions both to thread the nut onto the bolt of the fastener assembly, and to perform the compression action on the nut. Such a driver tool, powered by a rotary drive, provides rotation of the nut onto the bolt to bring together workpieces therebetween to a specified torque, and thereafter to initiate an inwardly operative compression or swaging force about the nut to swage or otherwise compress a portion of the nut onto the bolt to preclude inadvertent or environmentally induced separation of the fastener assembly. The socket-like tool, with its swaging inserts, engages a compressible portion of the nut and applies thereto an inwardly radial or compressive force to mechanically displace the selected portions of the nut into spline-like portions of a depth permitted by the minimum radius of the shank portion of the bolt. The compressed nut material, when mechanically deformed into the shank portion of the bolt, creates significant resistance to rotation and/or axial movement of the nut on the bolt, thereby precluding unthreading of the assembly. Thus, the fastener assembly together with the workpieces are maintained secure when subjected to hostile environmental conditions.

Among the several advantages of the fastener assembly of the present invention, the mechanical locking procedure provides a more effective lock arrangement than prior art fastener assemblies. Specifically, by locating the locking portion internally of the threaded portion of the assembly, greater resistance to unthreading is provided than is occasioned with fastener assemblies having the threaded portion internal of the locking portion. The threads of prior art assemblies can establish a thread pattern due to vibration, shock, and expansion/contraction due to temperature excursions, which in time can enable unthreading and possible separation to occur. In contrast, the internally arranged splines of deformed nut material of the present invention cause individual splines to establish resistance against unthreading rotation both as each spline is encountered by a cooperating groove of the bolt, and thereafter by the threads as each new portion of a spline is encountered thereby. Thus, in addition to the high resistance to rotation established by the splines of the nut relative to the complimentary knurled grooves of the bolt, further rotational resistance occurs as any rotation and/or axial movement of the nut occurs. Therefore, the resulting fastener assembly provides for a locking arrangement of greater permanence than comparably dimensioned fastener assemblies of the prior art, when used in equally severe environment conditions.

OBJECTS OF THE INVENTION

An object of the present invention is to provide a swaging tool for mechanically locking together components of a threaded fastener assembly to prevent separation thereof during use in severe vibration environments.

Another object is to provide a swaging tool, powered by a rotary driver to thread the nut of a fastener assembly onto the bolt thereof, and to swage a selected portion of the nut onto a selected portion of the bolt upon completion of the threading cycle.

Still another object is to provide a swaging tool for mechanically fastening a nut of a fastener assembly onto a bolt thereof, the tool having swaging inserts for mechanically displacing selected material of the nut into a predetermined portion about the bolt.

Yet another object is to provide a tool for swaging a predetermined portion of a nut into a bolt portion to preclude relative rotation between the fastener assembly components.

The above and other objects of the invention will be better understood by referring to the following description taken in conjunction with the accompanying drawings.

BRIEF DESCRIPTION OF THE DRAWINGS

FIG. 1 is an elevational view of a preferred embodiment of a fastener assembly with workpieces assembled, and with portions broken away for clarity.

FIG. 2 is a perspective view of a tool for swaging the fastener assembly, with portions broken away for clarity.

FIGS. 3A, 3B, and 3C are cross-sectional views of a fastener assembly taken on section line A—A of FIG. 1, showing the assembly both before and after swaging of the nut on the bolt of the assembly, and including a swaging tool in operative position.

FIG. 4 is a perspective view of an alternate embodiment of a tool for swaging the fastener assembly, with portions broken away for clarity.

FIGS. 5 and 6 are perspective views of other embodiments of a fastener assembly of the present invention.

DETAILED DESCRIPTION OF THE INVENTION

The novel fastener assembly is usable for fastening together workpieces or components of structures which are to be used under severe environmental conditions. Typically, the fastener assemblies may be used to join together components of high fatigue rated structures, which may be the sheets or skins of aircraft and other components, some of which may be used in air inlets for jet engines. Vibrations of varying frequency and amplitude over extended time intervals, and expansion and/or contractions due to significant temperature excursions create the hostile environmental conditions capable of causing separation of more conventional fastener assemblies. If the structures separate, and/or the nut comes apart from the bolt, such separation may permit the nut or a portion of the assembly to become ingested into the machine or engine in which it is used, resulting in damage to or destruction of the machine or engine. If the engine is used in an aircraft, the ultimate damage may be loss of the aircraft.

As shown in FIG. 1, a fastener assembly 10 is illustrated as comprising a bolt 20 and a nut 40 which together maintain assembled at least two workpieces 60, shown as sections or sheets of material to be held together, such as aircraft skins.

The dimensions of the components of the fastener assembly are selected according to the strength requirements needed to bring together the workpieces 60, and to hold them secure, as shown in FIG. 1. The diameter dimension of the bolt 20 is configured to be adequate for the material selected therefor to have sufficient strength to withstand shear forces generated thereon by the workpieces 60, and to withstand axial forces of the nut 40 when assembled thereon to retain the workpieces together. The length dimension of the bolt 20 is selected to enable secure mating of the nut 40 on the bolt 20 when the workpieces 60 are in position.

The bolt 20 has a head portion 22 which may be flush externally with the corresponding surface of the workpiece, or may be designed to extend either above or below the workpiece surfaces, as desired. Typically, the head portion 22 of the bolt 20 may be provided with a retainer or driver recess or slot 24, and/or the other end may be provided with a similar retainer or driver access, as shown at 25. Such a recess or slot 24 and/or retainer 25 is known to be used to enable the bolt to be restrained in position during assembly or threading thereon of the nut 40.

Below the head of the bolt 20, and extending substantially longitudinally thereof are a plurality of nut rotation resisting surfaces, shown as locking grooves or knurled portions 26. These knurled surfaces 26 may be spaced equally or unequally about the periphery of the bolt. The knurled surfaces formed about the bolt extend along a portion of the length of the bolt configured according to the desired strength of the fastener assembly, and/or the thickness dimension of the workpieces 60. These nut rotation resisting surfaces may be located proximate the head portion of the bolt or may be spaced therefrom by a relatively smooth shank portion 28.

Another portion of the length of the bolt 20 is provided with threads 32 of a depth and pitch, as required to provide for adequate retention of the nut 40 thereon in the manner of a more conventional nut and bolt assembly. In this preferred embodiment, the threaded portion 32 is proximate the inner end of the bolt 20 relative to the knurled portion thereof.

The nut 40 is of a length sufficient to engage the threaded portion 32 and at least a portion of the knurled surfaces 26 of the bolt 20, such that the nut can be assembled on the bolt with workpieces 60 between the head 22 of the bolt and a head portion 42 of the nut. The internally threaded portion 44 of the nut 40 is configured complimentary to the threads of the cooperating bolt 20.

Intermediate the head 42 and threaded portions 44 of the nut 40, a compressible portion 46 is formed externally with socket engageable surfaces, shown as chords or flats 48 in FIG. 3A, and concave surfaces 48a in FIG. 3C. These surfaces come together at junctions or apices 52. Internally, the compressible portion 46 of the nut is of a diameter to permit longitudinal movement thereof over the threaded portion 32 of the bolt, during initial assembly. The dimensions of the compressible portion 46 of the bolt, specifically the height of the apex junctions 52, are selected so that the rotational force applied thereto will torque the nut onto the bolt to a predetermined torque before swaging of the nut begins.

In a typical assembly, workpieces 60 are retained between the proximate surfaces of the head 22 of the bolt 20 and the head 42 of the nut 40. After tightening of the nut to the desired torque on the bolt, some of the material of the nut is displaced into the grooves of the compression area 26 of the bolt, as shown in FIG. 3B. The displacement of the material by compression or swaging is obtained by a tool, such as the tool 80 as shown in FIGS. 2, 3 and 4.

In a preferred embodiment of the tool 80, as shown in FIG. 2, the tool has a substantially hollow socket or nut engaging portion 82, and a driver engageable portion 84 defining the opposite end thereof. Intermediate the ends of the socket, and partially recessed within the wall 86 of the socket 80 are swaging inserts 90, which extend slightly inwardly of the interior of the socket. The length of radius dimensions of the tool are selected to provide efficient functioning with the nut and bolt of a fastener assembly 10 having pre-selected dimensions. That is, the socket portion 82 of the tool is configured to a length to recess over a portion of the bolt 20 and a portion of the nut 40 when threaded onto and fixed to the bolt. Similarly, the internal radial dimension of the socket-like tool 80 is selected to be a slightly greater radius than the external central radius of the driver engaging surfaces 48 of the nut to be operated on thereby, yet to approach the minimum radii of the apex junctures 52 between the surfaces 48. The resulting configuration of the nut enables threading of the nut onto the bolt in the manner of a conventional fastener assembly, until the nut and workpieces are tightened one against the other.

The swaging inserts 90 in the tool 80 are formed of material selected to have a hardness factor greater than that of the material of the nut 40. These inserts, preferably of cylindrical shape, may be dimensioned to a length greater than, substantially equal to, or less than the length of the desired compression area of the nut. The inserts may be assembled in the tool 80 against any movement, but are preferably rotatable in seats 92 formed in the socket wall 86. Following location of the inserts 90 within the seats 92, a retainer sleeve (not shown) may be positioned over bearing ends or portions of the inserts to retain the same in position when a nut is not loaded therein. Alternatively, a portion of the internal wall may be swaged or otherwise formed over portions of the inserts as necessary to preclude disengagement of the inserts from the socket 80.

Variations of the nut configuration are shown in FIGS. 3A and 3C. The apices or junctions 52 between the driver engaging surfaces or flats 48 of the nut 40 may be aligned with or positioned between the knurled portions or grooves 26, 26a of the bolt 20. The swaging causes displacement of the quantity of material in the area 62 of the nut into the grooves of the bolt. That is, the material of the nut beyond the radius as defined by the central radius of flats 48 is forced inwardly in a substantially radial manner.

Following insertion of a bolt 20 through pre-prepared bores in workpieces 60, a nut 40 is mated with the driveable socket 80. Some of the external driver engaging surfaces 48 of the nut are aligned with corresponding swaging inserts 90 in the socket. Upon rotation of the socket tool 80, the nut 40 is threaded onto the bolt 20 until the head portion 42 of the nut tightens the workpieces 60 against one another and the internal portion of the head 22 of the bolt. Continued rotation of the socket 80 causes the swaging inserts 90 of the tool 80 to apply inwardly radial force to the surface portions of the nut at a radius greater than the minimum radius of surfaces 48. This causes material at the compression area 46 of the nut 40 to be displaced, and compressed or swaged into the grooves 26 of the bolt 20. Such compression occurs as the swaging inserts move from the flats 48 of the nut 40 over the apex junctions 52, thereby reducing the external diameter of the compression area of the nut to a dimension substantially corresponding to the internal radius defined by inserts 90, and the radius at the center of the flats 48 of the nut. Since the mechanical force displaces or pushes material of the swaged portion of the nut inwardly in a substantially radial manner, the final external diameter of the nut will not exceed the maximum internal diameter of the swaging inserts 90. Upon completion of the swaging of the nut, the socket tool 80 will rotate freely about the nut until the tool is withdrawn or rotation thereof is stopped. The swaging action is accomplished solely by rotational action on the nut thereby avoiding distortion of the workpieces which might be caused by axial swaging action.

Although in the preferred embodiment of the fastener assembly 10 in FIG. 1, the compression area 46 of the nut 40 is of a length less than that of the axially grooved or knurled area 26 of the bolt 20, the compression area may be extended to engage a selected portion of the threaded area 32 of the bolt, as well as a portion of the shank 28 of the bolt 20.

Another embodiment of the socket tool is shown in FIG. 4. In this tool 80', the swaging inserts 90' are formed as spheres, or balls recessed partially in seats in the wall 86' of the socket. These balls may be aligned equal distances from a longitudinal datum line of the tool, or may be aligned at different longitudinal distances t, so as to individually engage the nut 40 in different tracks along the compression area 46 thereof. The balls in these tracks, whether equally or unequally spaced circumferentially, adequately swage the nut onto the bolt to preclude separation of the fastener assembly.

In FIG. 3C is illustrated a modification of the nut 40 on which the socket engaging surfaces, shown previously as chords or flats 48, are replaced by slightly concave surfaces 48a. With this embodiment of the nut, a socket 80 can be selected having an inner diameter corresponding to the least diameter of the nut, i.e. the diameter formed by the bottoms of the concave surfaces 48a. As can be appreciated from a comparison of material displaceable from area 62 in FIG. 3A, and the material displaceable from area 62a in FIG. 3C, a greater quantity of material is seen to be displaced in the latter configuration. The areas are compared in that the depth of the area at 62 is the depth shown at "r" in FIG. 3A, whereas the depth at area 62a is the depth "r" plus the additional depth from the chord to the bottom of the concave surface 48a. Since the depth of the substantially triangular area at 62a is greater than that at 62, but the separation between apices 52 is unchanged, the base of the area is extended as well.

The greater quantity of displaced material in FIG. 3C therefore provides for somewhat greater compression of material into the grooves of knurled portions 26a of the bolt 20. By increasing the area 62 defining the quantity of material to be displaced, a higher torque level must occur during threading of the nut 40 on the bolt 20 before swaging of the nut will be initiated. Thus, the swaging action required for compressing of material of the nut on the bolt is increased, providing for enhanced retention of the components of the fastener assembly.

Another embodiment of a bolt of the fastener assembly is shown in FIG. 5. The bolt 20' is configured so that the shank diameter ribs of the knurled portion 26' thereon are not parallel one with another. By this configuration, after the nut 40 is assembled and material thereof is compressed into the grooves or around the ribs of the knurled portion of the bolt, the nut is incapable of axial or rotational movement relative to the bolt.

In another embodiment of the bolt 20" as shown in FIG. 6, the locking knurled portion 26" may be inclined slightly relative to the longitudinal axis of the bolt. Ideally, the direction of inclination is opposite to the nut unthreading direction to cause the deformed material of the nut to wedge against the radial walls of the bolt forming the knurled portion, and further preclude inadvertent unthreading of the nut 40 from the bolt 20.

The nut rotation resisting portion 26 of the bolt is arranged internally of the threaded portion of the bolt to provide greater locking permanence than is available with known prior art designs. By the present arrangement, the nut fixed on the locking portion 26 is incapable of rotation due to the spline-like formation of material thereof in the grooves of the bolt. No threads or threaded portions are available to establish the necessary rotational track for unthreading of the nut. Further, should any axial displacement of the nut on the bolt occur, the spline formed by nut material extending longitudinally of the bolt will resist cutting action of threads 32 of the bolt. That is, each spline of the nut complimentary to a groove will establish significant rotational resistance on each occasion when a thread is encountered. Also, any loosening action of the nut on the bolt will cause fresh ridge portions to further wedge against the threads. Thus, the possibility of a continuous thread being formed on the nut for unthreading engagement with respect to the threaded portion 32 of the bolt is substantially nil.

In view of the configuration of the fastener assembly 10, the nut 40 cannot move into tighter engagement with the workpiece 60, and cannot move away from the workpiece. Due to wedging action of the deformed material of the nut into the grooves of the bolt 20, significant torque in excess of the untorqued forces caused by vibrations, shocks, and temperature excursions that occur during normal operating conditions, must be applied for disassembly.

It is further understood that variations and modifications of the present invention which lie within the scope of the appended claims are fully contemplated.

I claim:

1. A rotary driver and swaging tool for mechanically joining together threaded nut and bolt components of a fastener assembly joining workpieces, said nut having upper and lower axially contiguous portions, the lower portion being threaded for engaging the bolt and being externally circularly cylindrical, and said upper portion being given a polygonal shape defining apexes joined by flats to form a tool engageable configuration for turning, said tool comprising:

a drive socket formed of a unitary body having upper and lower inner and axially contiguous portions therein, said lower portion extending the length of and surrounding the lower threaded portion of the nut and clear of contact therewith, and further provided with a land defining a floor for contacting and axially supporting the bottom of the nut as the same is positioned and driven onto the bolt, said upper portion having a dimension also spaced clear of contact with the polygonal portion of the nut, a plurality of swaging inserts being substantially circular in transverse cross-section, said upper portion including recesses for mounting the swaging inserts therein, the radially outer-most portion of said recesses supporting said inserts against radially outward thrust during swaging and in fixed radial and axial positions, said inserts protruding radially inward beyond said recesses and spaced to clear the flats of the nut so as to enable the socket to be slid over the nut with the socket and nut portions in respective axial correspondence, said socket and inserts being constructed and arranged to place the inserts close enough to interfere with the nut apexes when rotated about the tool axis so that, at first, the inserts drive the nut up to a predetermined tightness whereat less energy will be expended in swaging than tightening the nut, after which said inserts, while supported by the socket in said fixed positions swage the nut apexes and nut body into the shank of the bolt, the tool thereby intermittently driving the apexes of the nut portions of the nut body radially inward into locking engagement with the bolt after which the tool turns freely, the nut having been tightened to specification, the nut and bolt being thereby locked together by the swaging action into permanent engagement with each other and the tool engageable apexes of the nut having been swaged away so that the nut is no longer removable, and means at the lower portion adapted to be engaged by a rotary motion driving tool.

2. A rotatably driveable tool as in claim 1 wherein said swaging inserts are configured cylindrically, and are of a length substantially equal to the compression area of the nut of the fastener assembly.

3. A rotatably driveable tool as in claim 1 wherein said swaging inserts are configured cylindrically, and of a greater length than the compression area of the nut of the fastener assembly.

4. A rotatably driveable tool as in claim 1 wherein said swaging inserts are configured as spheres.

5. A rotatably driveable tool as in claim 4 wherein at least two of said swaging insert spheres are arranged in different tracks longitudinally of the compression area of the nut of the fastener assembly.

6. A rotatably driveable tool as in claim 1 wherein said swaging inserts extend inwardly of said socket to engage the socket engaging surfaces defining a compression area on the exterior of the nut, whereby upon rotational driving of said tool, the material of the nut at a radius greater than the center of the socket engaging surfaces of the nut is swaged by said inserts to a radius corresponding to the radius at the centers of the surfaces, thereby compressing the swaged material into grooves of the bolt of the fastener assembly.

* * * * *